Feb. 24, 1970  C. E. ODIAGA ET AL  3,496,939
SURGICAL ANASTOMOTIC SLEEVE COUPLING
Filed Aug. 9, 1967
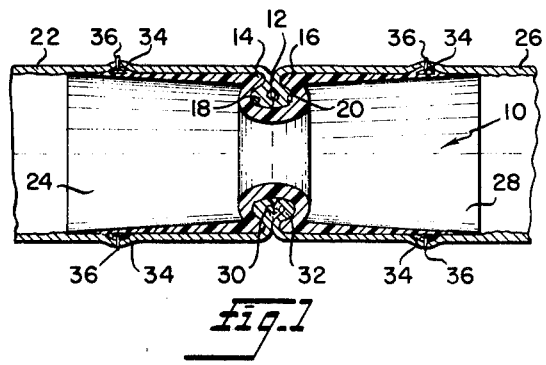
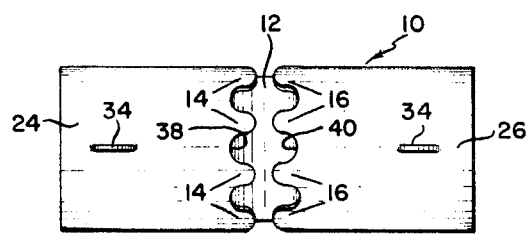
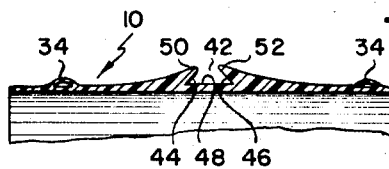
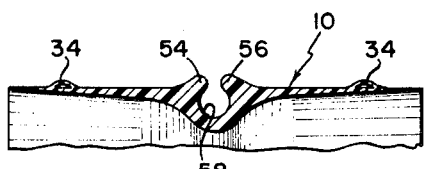
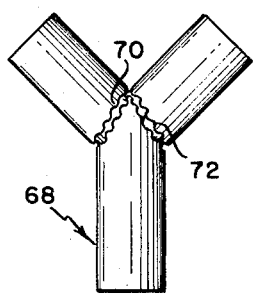
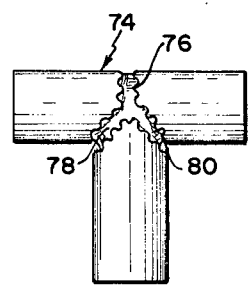
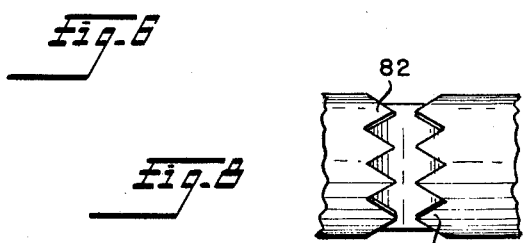
INVENTORS
Carlos E. Odiaga, M.D.
Bernard Edward Shlesinger, Jr.
BY
ATTORNEYS United States Patent Office 3,496,939
Patented Feb. 24, 1970

3,496,939
SURGICAL ANASTOMOTIC SLEEVE COUPLING
Carlos E. Odiaga, 7032 Arbor Lane, McLean, Va. 22101, and Bernard Edward Shlesinger, Jr., 3906 Bruce Lane, Annandale, Va. 22003
Filed Aug. 9, 1967, Ser. No. 659,528
Int. Cl. A61b 17/11
U.S. Cl. 128—334
22 Claims

ABSTRACT OF THE DISCLOSURE

An anastomotic connector or the like for receiving the ends of flexible tubing comprising a sleeve, having an annular groove in the outer surface thereof for receiving the tubing ends, and the annular groove having an undercut on at least one side to form at least one lip, and the width of the groove at the lip being less than twice the minimum thickness of the tubing wall so that said lip clamps the tubing ends in the groove when the ends are jammed into the groove, and the lip being slotted at intervals about its circumference.

This invention relates to devices for surgically anastomosing a hollow or tubular organ to another, as for example the severed ends of the intestine after resection. It can also be used as a connector or rubber tubing, etc.

HISTORICAL BACKGROUND

The present techniques used in the medical field for joining the severed ends of the intestine are to laboriously stitch the severed ends together. The technical difficulties are numerous due to inaccessibility of one of the ends to be joined, friability of the tissue where stitches might cut through them, and of somewhat less importance, disparity in the diameters of the tube to be anastomosed. At present the ends are usually turned inwardly in order to facilitate healing. The necessity of turning the edges of the intestine inwardly presents additional problems to the surgeon performing the operation. Since the suturing must take place around the circumference of the intestines, many difficulties are encountered in holding and gripping the intestines and rotating the same for proper application of the sutures and the like. Time is an important factor in any operation and there have been a number of different proposals made to reduce the time required to perform an anastomosis. Most recently, a stapling machine has been developed which can be inserted through a slit in the intestine for purposes of stapling the two ends together. This does not solve all of the problems because for one thing, the surgeon must have sufficient room to manuever the instrument. Furthermore, the row of staples must be reinforced by conventional sutures.

Although there have been a number of attempts to improve the surgical techniques relative to anastomosis, none have proved to be as satisfactory as the time consuming method of hand suturing the ends together. On the average, a half hour or more is required to preform this phase of the operation. Even so, the anastomosis is not always satisfactory.

The primary reason for not utilizing a permanent connection, is that a permanent piece of tubing or the like will prevent the changes in diameter which are necessary for the proper function of the intestine and could even result in a relatively inadequate lumen. Furthermore, the intestine is so designed that it can expand considerably from its normal size and any connection that would be inserted for permanency must not only have the ability to produce peristalsis, but also to expand in the same manner as the normal intestine.

OBJECTS AND SUMMARY

It is therefore an object of this invention to provide an anastomosis which may be applied by the surgeon rapidly and easily.

Another object of this invention is to provide an anastomosis which is soluble in the body fluids.

A further object of this invention is to provide an anastomosis or the like which progressively dissolves from the ends towards the middle or central portion in order that the area of connection will be properly healed prior to dissolution of the anastomosis.

Yet another object of this invention is to provide an anastomosis which is inexpensive to manufacture and which is constructed of a single piece of material.

Another object of this invention is to provide a device which can be used even if the quality of the tissue is inadequate for safe suturing.

Yet another object of this invention is to provide an anastomosis or the like which can be easily manipulated and rotated by the surgeon when installed.

A further object of this invention is to provide an anastomosis or the like which will hold the ends of the intestine or other similar tubing or the like in close contact with each other and in clamped relation for purposes of forming a permanent bond at the juncture of the contacting ends.

Still a further object of this invention is to provide an anastomosis which may readily be provided in various sizes so that proper connections between the ends of the severed intestine may be made with a minimum of difficulty.

To summarize the invention, it relates to a soluble coupling which has a certain flexibility so as to provide a clamping action for abutting ends of tubing which are slipped over the ends of a sleeve and tucked into an annular groove in the sleeve and thus maintained in clamped relationship to each other for a period of time sufficient to enable the ends to be bonded permanently to each other.

It is to be further noted that the annular slot must be undercut and that the lip formed by the undercut or lips as the case may be, must be slotted when used for surgical purposes due to the fact that continuous pressure on all surfaces around the tucking area could cause a sloughing-off of the tissue because impaired blood supply. Therefore, this anastomosis or coupling must be slotted to provide a series of spaced fingers so that intermediate the fingers, there will be areas of less-pressure contact to allow blood supply to reach in adequate amounts the anastomosing area. This gradual dissolving would allow gradual regeneration tissue until the entire circumference has properly healed. Furthermore, a good deal or sealing off of the anastomotic line takes place during the first few days, but adequate strength in the anastomosis is not obtained for at least two weeks. In three weeks dissolution time in body fluids would be sufficient in most instances to provide proper preliminary healing. Longer or shorter dissolution times for anastomosis may be used depending upon the type of soluble material and the thickness. In most instances, the patient will not return to regular food for some period of time and can be kept on I.V. until the initial phases of healing have taken place. The inactivity of the intestinal tract at this time would prevent spillage or leakage during the first few days.

These and other objects and advantages of this invention will be apparent from the following description and claims.

In the accompanying drawings which illustrate by way of example various embodiments of this invention:

FIGURE 1 is a cross-sectional view of the invention as used in connecting the ends of an intestine;

FIGURE 2 is a side elevational view of the invention;

FIGURES 3, 4 and 5 are cross-sectional views each illustrating a different embodiment of the invention;

FIGURE 6 is a plan view illustrating the invention in a Y-configuration;

FIGURE 7 is a plan view illustrating the invention in a T-configuration;

FIGURE 8 is an enlarged view in fragment showing another configuration of the clamping fingers.

FIGURES 1 and 2

The anastomosing device or coupling 10 is tubular or sleeve-like in configuration and is provided with an annular groove 12 having rounded lips or edges 14 and 16 and undercut portions 18 and 20. A portion of the severed intestine 22 is slipped over the end 24 of the sleeve or coupling 10. The other severed end portion 26 is slipped over the other end 28 of the anastomosis or sleeve 10. The cut ends 30 and 32 are stuffed or jammed into the annular groove or slot 12. The width of the groove 12 at lips or shoulders 14 and 16 is slightly less than twice the minimum wall thickness of the intestine or member to be joined. Eyelets 34 are formed in the sleeve 10 at spaced intervals around the sleeve and preferably nearer to the ends of the sleeve 10. The eyelets 34 are connected to the intestine portions 22 and 26 by means of stitching 36. Three eyelets integrally formed in the sleeve 10 and positioned generally 120° from each other would normally be sufficient at each end to permit the surgeon to rotate the intestine and the sleeve as desired while stuffing the ends of the intestine 30 and 32 into the annular groove or slot 12. The eyelets 34 will maintain the intestine on the sleeves without the danger of pulling the ends of the intestine from the groove 12. Other eyelets may be provided as deemed necessary and stitching from eyelet to eyelet may be used to provide additional security.

In FIGURE 2, the lips or fingers 14 and 16 are slotted as at 38 and 40 at spaced intervals around the annular groove 12 so as to produce a series of individual fingers or lips 14 and 16. The slotting approximates the width of the fingers and is cut back also approximately the width of the fingers so that the depth of the slots approximates the width of the fingers. In connecting live tissue, as for example the ends of severed intestines, blood will circulate freely in the area of the slots and as the anastomosis or coupling dissolves, a proper bridging will be made across the entire annulus thus making a proper splice without danger of rupture.

It is to be noted that the fingers 14 and 16 in FIGURE 2 are rounded at the ends for reducing tearing of tissue when forced between the fingers 14 and 16. Because of the composition of the material, there will be some flexing of the finger inwardly as the body intestinal tissue is jammed or forced into the annulus 12.

FIGURES 3, 4 and 5

In FIGURE 3, the sleeve 10 is provided with a slot 42, the edges 44 and 46 are doubled and undercut and the bottom of the slot 48 is flat. The beveling or undercutting of the edges 44 and 46 provides flexure for the fingers 50 and 52. Lips or shoulders 14 and 16 of FIGURES 1 and 2 may also be beveled if desired to give inward flexure rather than outward flexure in order to provide for greater lock action initially.

FIGURE 4 differs slightly from FIGURE 3 and the device shown in FIGURES 1 and 2. All of the couplings 10 become thicker as they get nearer the clamp portion where the annular slot is provided. The increased thickness in the area of the clamp as shown in FIGURE 4 takes place both above and below the central horizontal axis of the wall of the sleeve 10. This arrangement allows for flexing at the fingers 54 and 56 and at the bottom bridge portion 58. By proper bowing of the coupling 10, the slot opening can be expanded to permit ease of entry of the material to be stuffed therein.

FIGURE 5 shows the slot 60 as being undercut on one side only to form a finger 62 which has a beveled surface 64. The opposite wall 66 of the slot 60 is substantially perpendicular. Clamping action takes place between the finger 62 and the wall 66.

FIGURES 6 and 7

FIGURE 6 illustrates in another coupling 68 which is generally Y-shaped. Two annular grooves 70 and 72 are provided and have all of the features discussed relative to the structures heretofore mentioned including undercutting and slotting as required.

Similarly, FIGURE 7 shows a T-coupling 74 with intersecting annular slots 76, 78 and 80 operating in the manner similar to that heretofore described.

FIGURE 8

FIGURE 8 illustrates how the fingers 82 and 84 may be pointed rather than rounded as illustrated in the embodiment shown in FIGURE 2. Such an arrangement may be necessary in order to get anymore secure and biting action when the material is wedged into the slot.

We claim:
1. An anastomotic connector or the like for receiving the ends of flexible tubing comprising:
   (a) a sleeve,
   (b) said sleeve having an annular groove in the outer surface thereof for receiving the tubing ends,
   (c) said annular groove being undercut on at least one side thereof to form at least one lip,
   (d) the width of said groove at said lip being less than twice the minimum thickness of the tubing wall so that said lip clamps the tubing ends in said groove when the ends are jammed into the groove, and
   (e) said lip being slotted at intervals about its circumference.

2. An anastomotic connector as in claim 1 and wherein:
   (a) said slots are in length approximately the width of said undercut.

3. An anastomotic connector as in claim 2 and wherein:
   (a) said slots are in width approximately the width of said undercut.

4. An anastomotic connector as in claim 1 and wherein:
   (a) said annular groove is undercut on both sides of said annular groove.

5. An anastomotic connector as in claim 1 and wherein:
   (a) said lip is resilient and spring-like.

6. An anastomotic connector as in claim 5 and wherein:
   (a) said lip is depressable only.

7. An anastomotic connector as in claim 1 and wherein:
   (a) said connector is made of a semiflexible moldable material.

8. An anastomotic connector as in claim 1 and wherein:
   (a) said connector is made of a composition soluble in body fluids.

9. An anastomotic connector as in claim 1 and wherein:
   (a) said sleeve includes at least one tube fastener spaced from said groove.

10. An anastomotic connector as in claim 1 and wherein:
    (a) said sleeve includes a plurality of annularly spaced fasteners at spaced positions on either side of said groove.

11. An anastomotic connector as in claim 1 and wherein:
   (a) said groove is centrally located in said sleeve, and
   (b) the wall thickness of said sleeve increases in the area of said groove.

12. An anastomotic connector as in claim 8 and wherein:
   (a) said sleeve is less soluble in the area of said groove than at its ends.

13. An anastomotic connector as in claim 1 and wherein:
   (a) said sleeve is an integral, one-piece member.

14. An anastomotic connector as in claim 1 and wherein:
   (a) said slotted lip forms a series of pointed clamp fingers.

15. An anastomotic connector as in claim 1 and wherein:
   (a) said slotted lip forms a series of rounded clamp fingers.

16. An anastomotic connector as in claim 14 and wherein:
   (a) said clamp fingers are beveled on the underside thereof.

17. An anastomotic connector as in claim 15 and wherein:
   (a) said clamp fingers are beveled on the underside thereof.

18. An anastomotic connector as in claim 1 and wherein:
   (a) said sleeve includes a plurality of said annular grooves, and
   (b) said sleeve has at least three ends.

19. An anastomotic connector as in claim 18 and wherein:
   (a) said sleeve is T-shaped.

20. An anastomotic connector as in claim 18 and wherein:
   (a) said sleeve is Y-shaped.

21. An anastomotic connector as in claim 18 and wherein:
   (a) said sleeve has at least two intersecting grooves.

22. In combination, an anastomotic connector as in claim 21, and wherein:
   (a) said lip is slotted at intervals about its circumference.

References Cited
UNITED STATES PATENTS

| | | | |
|---|---|---|---|
| 1,470,707 | 10/1923 | Bates | 128—334 |
| 2,127,903 | 8/1938 | Bowen | 128—334 |
| 2,428,918 | 10/1947 | Miller | 128—334 |
| 2,638,901 | 5/1953 | Sugarbaker | 128—334 |
| 2,828,979 | 4/1958 | Wiltse | 285—370 X |
| 3,155,095 | 11/1964 | Brown | 128—334 |
| 3,176,690 | 4/1965 | H'Doubler | 128—348 |
| 3,221,746 | 12/1965 | Noble | 128—334 |

DALTON L. TRULUCK, Primary Examiner

U.S. Cl. X.R.
285—260, 397